US008417598B2

(12) United States Patent
Pinkusevich et al.

(10) Patent No.: US 8,417,598 B2
(45) Date of Patent: Apr. 9, 2013

(54) VEHICLE IDENTIFICATION SYSTEM, METHOD AND RECHARGING STATION FOR ELECTRIC VEHICLES

(76) Inventors: Igor Pinkusevich, Aventura, FL (US); Lenny Novikov, Cliffside Park, NJ (US)

( * ) Notice: Subject to any disclaimer, the term of this patent is extended or adjusted under 35 U.S.C. 154(b) by 389 days.

(21) Appl. No.: 12/725,441

(22) Filed: Mar. 16, 2010

(65) Prior Publication Data

US 2010/0241542 A1  Sep. 23, 2010

Related U.S. Application Data

(60) Provisional application No. 61/210,306, filed on Mar. 17, 2009.

(51) Int. Cl.
*G07F 19/00* (2006.01)
*H02J 7/00* (2006.01)
(52) U.S. Cl. .......................................... 705/34; 320/109
(58) Field of Classification Search ............... 705/34; 320/109
See application file for complete search history.

(56) References Cited

U.S. PATENT DOCUMENTS

| 6,263,319 | B1 * | 7/2001 | Leatherman ............... 705/30 |
| 6,763,299 | B2 * | 7/2004 | Jones ....................... 701/465 |
| 6,930,410 | B2 * | 8/2005 | Ikeda et al. ............... 307/140 |
| 2005/0165639 | A1 * | 7/2005 | Ross et al. ................. 705/14 |
| 2005/0270178 | A1 * | 12/2005 | Ioli ........................... 340/932.2 |
| 2007/0288294 | A1 * | 12/2007 | Olsen et al. ............... 705/9 |
| 2009/0079388 | A1 * | 3/2009 | Reddy ...................... 320/109 |
| 2009/0289113 | A1 * | 11/2009 | Vilnai et al. ............... 235/381 |
| 2010/0057282 | A1 * | 3/2010 | Katrak et al. ............. 701/22 |
| 2010/0065344 | A1 * | 3/2010 | Collings, III ............. 180/2.1 |
| 2010/0228415 | A1 * | 9/2010 | Paul .......................... 701/22 |
| 2011/0071932 | A1 * | 3/2011 | Agassi et al. ............. 705/34 |
| 2011/0288909 | A1 * | 11/2011 | Hedley et al. ............ 705/13 |

* cited by examiner

*Primary Examiner* — Matthew Gart
*Assistant Examiner* — Ashford S Hayles

(57) ABSTRACT

Electric vehicle recharging system in public garages and parking facilities that utilizes a vehicle identification to prevent energy theft and to provide a reliable and safe method to resume recharging process without any manual authorization after recharging interrupt.

26 Claims, 5 Drawing Sheets

Vehicle Identification System Functional Diagram

FIG. 1  Prior Art Example
US Patent Number: 4,532,418   Date of Patent: Jul. 30, 1985
MICROPROCESSOR ELECTRIC VEHICLE CHARGING AND PARKING METER SYSTEM STRUCTURE AND METHOD.
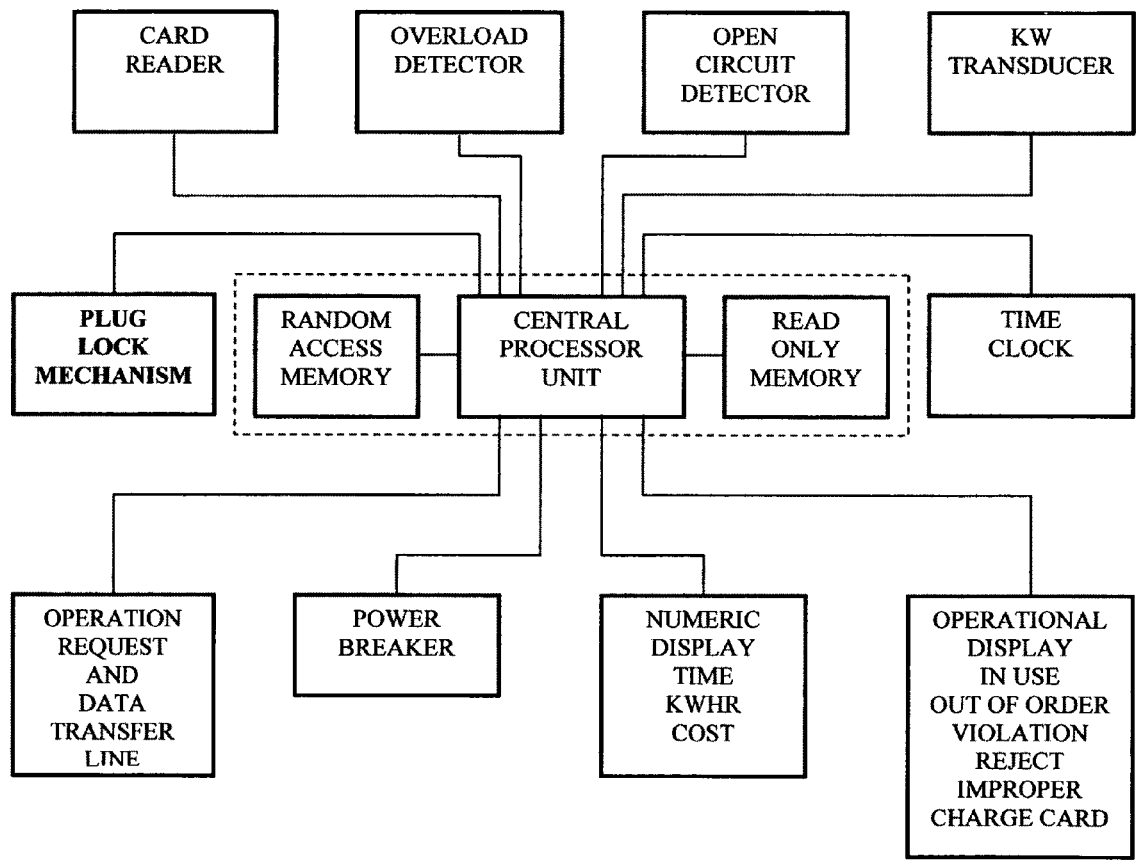

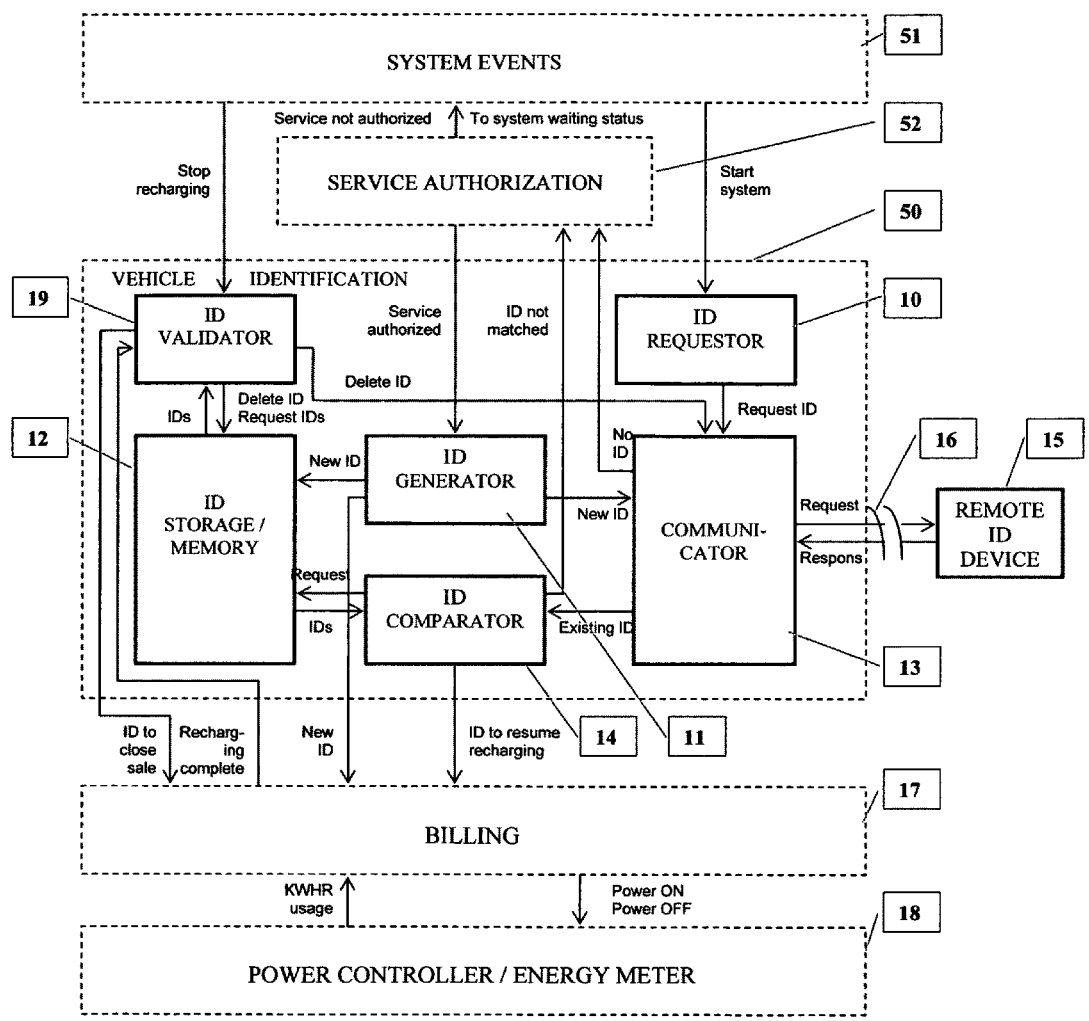
FIG. 2 Vehicle Identification System Functional Diagram

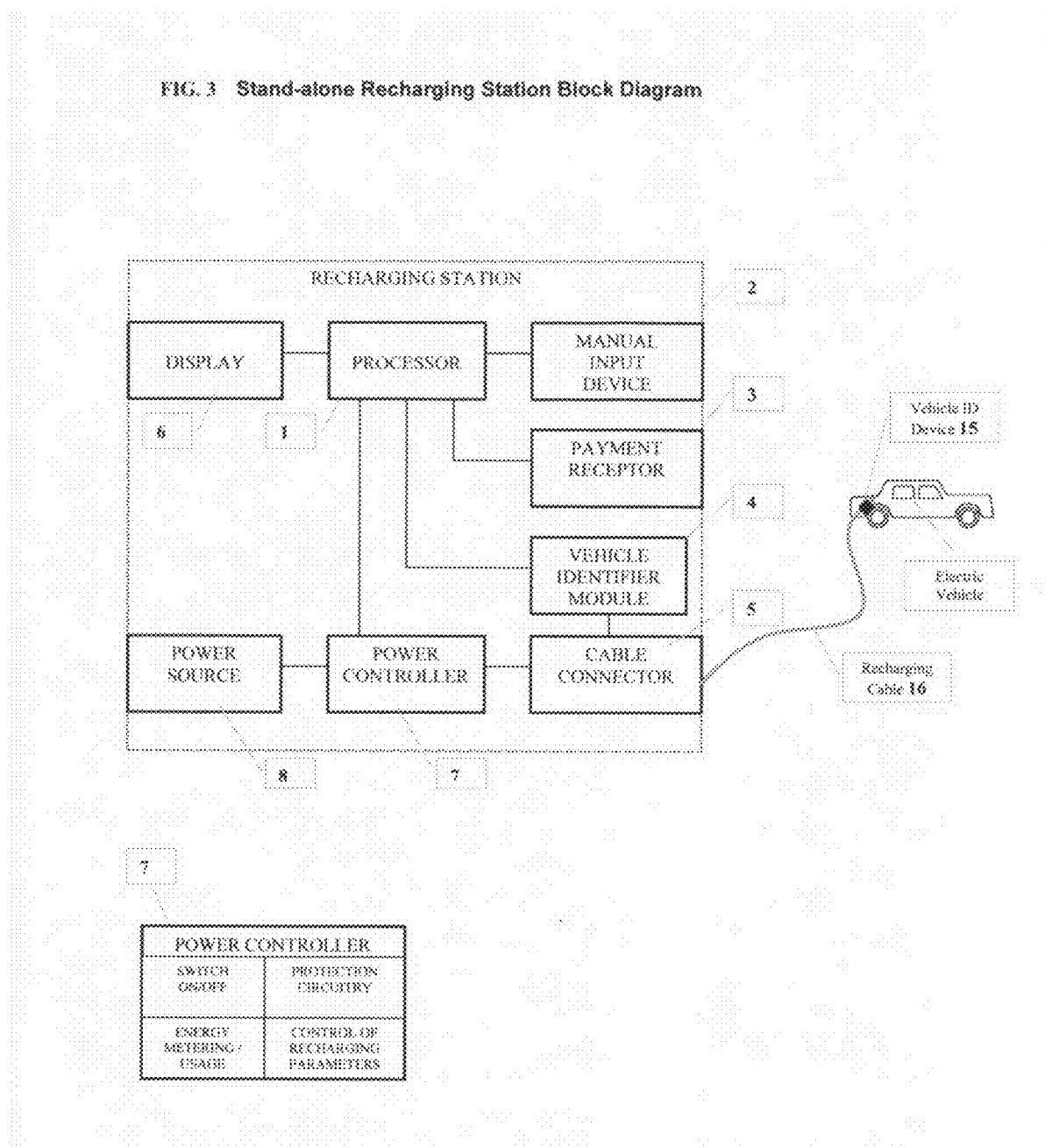

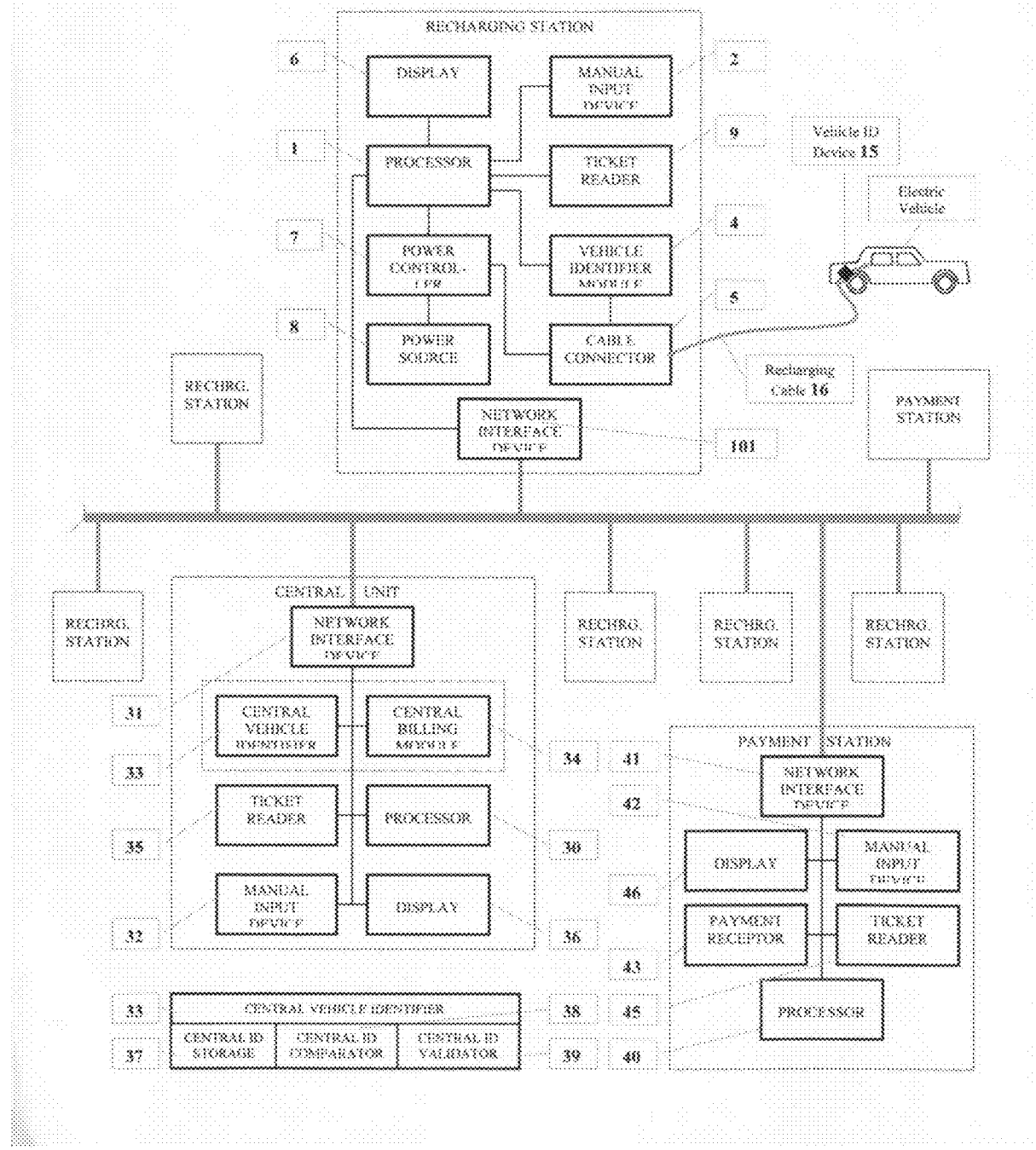

Fig.5  Vehicle ID Device Block Diagram
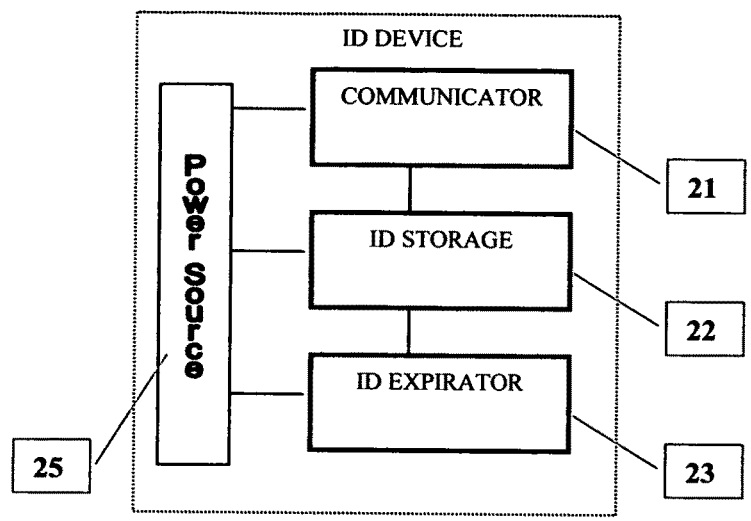

VEHICLE IDENTIFICATION SYSTEM, METHOD AND RECHARGING STATION FOR ELECTRIC VEHICLES

CROSS REFERENCE TO RELATED APPLICATION

This application claims the benefit under 35 USC 119 of the filing date of U.S. Provisional Application Ser. No. 61/210,306 filed Mar. 17, 2009, now expired, the entire contents of which are incorporated by reference herein.

BACKGROUND OF THE INVENTION

1. Field of Invention

The present invention relates to battery recharging system for electric and hybrid electric vehicle. More specifically it relates to the vehicle identification used in an electric vehicles recharging station.

2. Description of Prior Art

Periodic charging of electric vehicles is a necessity. Public recharging facilities and power stations in garages and parking places, such as garages of apartment buildings and shopping mall parking facilities, are not currently available. This problem severely limits the realistic use of electric automobiles.

Unlike conventional fuel operated vehicles which can be refueled in minutes, it takes hours to recharge electric automobile batteries. It is unlikely that a garage attendant or a vehicle operator stays with the vehicle throughout the entire recharging process. That opens possibilities for energy theft.

In an attended parking facility the garage personnel may need to disconnect a car from the recharging station and move it around. Then the car should be connected to the same or to another station to continue recharging.

Severe power outages can occur during the charging period. They may also create a problem in recharging continuation due to expired authorization.

There is a need for a reliable method to prevent energy theft in recharging facilities. There is also a need for automatic continuation of the recharging process after any recharging interrupt, so that no manual authorization of recharging after such interrupt would be necessary.

Solutions available in the prior art do not address these issues.

The U.S. Pat. No. 4,532,418 to Meese offers using a mechanical lock to prevent disconnecting an electric car from a recharging station until recharging is complete, as shown in FIG. 1 While this solution prevents energy theft it creates a problem when there is a need to move the vehicle around. That can be unsafe in emergency situations. The same patent discloses a charging station with the card reader and a separate charge card that may be obtained through a local power company or from the operator of a parking facility, such as shopping malls and garages. In case of any termination of recharging during a parking period the valid charge card should be manually "inserted for the second time", which is impossible if the card owner or an attendant are not present. In the event of power interruption in a large public parking facility this invention does not provide a convenient solution to continue recharging when power is restored.

The U.S. Pat. No. 6,081,205 to Williams teaches to use time meters for energy charges. In this invention recharging is going on during certain paid time. Such method also cannot prevent electric energy theft in a public garage if any unauthorized car is connected and recharged instead of the car that is billed for the energy usage.

It is an objective of this invention to provide a reliable method to facilitate automatic continuation of the recharging process without authorization of the vehicle operator or a garage attendant after interrupt in recharging for preventing energy theft and promoting safety in public garages and parking facilities.

SUMMARY OF THE INVENTION

The solution for above issues is to associate the authorization for electric energy usage with a vehicle that receives such energy for recharging. Present invention resolves the above-mentioned issues by implementing a vehicle identification system.

The presented vehicle identification system and method enable a recharging station to identify an electric vehicle connected to it for recharging, and resume recharging after any recharging interrupt.

It is understood that recharging authorization is essential for keeping track of energy usage and receiving an appropriate payment for the amount of electric energy used in recharging and for other services, which may include parking and any other associated sales.

The variety of billing/payment arrangements, which can be implemented in electric vehicle recharging, is beyond the scope of the present invention and omitted for clarity.

Hereinafter, an electric or electric hybrid vehicle or any other type of vehicle that use an external source of electric energy for recharging its batteries is referred to as a "vehicle", the recharging station is referred to as a "station", identification as "ID", and any event of the recharging interrupt due to either power outage or disconnection and subsequent reconnection of the charging cable is referred to as a "recharging interrupt".

BRIEF DESCRIPTION OF THE DRAWINGS

FIG. 1—Prior art example, shows U.S. Pat. No. 4,532,418 diagram of recharging structure with a lock mechanism on recharging cable plug. FIG. 2—Vehicle Identification system functional diagram FIG. 3—Stand-alone recharging station block diagram FIG. 4—Network of recharging stations block diagram FIG. 5—Vehicle ID device block diagram

DESCRIPTION OF THE PREFERRED EMBODIMENT

The description of the preferred embodiment is intended for illustration and not for limitation purposes, and it is understood that those skilled in art can find different implementations of this invention without departing from the scope and spirit of the invention.

In the most basic form of the preferred embodiment, the vehicle is equipped with a unique key, and the station is equipped with a reader to receive identification information from this key. Every time a vehicle is connected to a recharging station, the recharging station obtains vehicle ID information from the key and, if this ID is recognized as previously associated with valid authorization, the recharging process resumes. If the ID is not recognized, the recharging station requests a payment or any other form of recharging authorization. When authorization is received, the vehicle ID is stored by the recharging station in association with this authorization.

The key may be provided in a form of a mechanical key, any form of a magnetic or optical media, or an electronic device communicating to the reader through wires or wirelessly.

When using wireless communication either optical or using electromagnetic waves, it is preferred to use short distance communication devices to ensure that the ID is received from the same vehicle that is connected to the station. For example, if an RFID (Radio Frequency Identification Device) chip is used, it should be located either in the vehicle's charging port or in a separate enclosure (a tag) attached to the vehicle, and the reader of the station should be placed accordingly. It is also possible to use acoustic waves or infrared as the form of wireless communication.

Wired communication may be achieved through extra contacts on the charging plug or through the main power conductors of the charging cable by using any form of a power line communication (PLC).

A non-electronic key is simply read by the reader, and the ID information is stored by the station until the charging is complete, or for a predetermined period of time, if interrupted.

An electronic key may communicate the ID information to the reader on its own, e.g. when first connected to the station and then every, say, 30 seconds. Alternatively, it may communicate the ID in response to a query from the reader, which in this case may be referred to as an interrogator.

An electronic key, which may also be referred to as an electronic "ID device", may use either prerecorded fixed ID information, or generate new ID information every time a new charging cycle is initiated. The ID information may include any relevant data regarding charging requirements, such as recommended charging mode, a current battery charge level, vehicle or battery model, etc.

Alternatively, the ID may be generated and assigned to the vehicle by the station upon charge initialization, and then requested back periodically, or after the recharging interrupt. In this case, the assigned ID is stored by the vehicle's ID device. The assigned ID may contain a time stamp, a station ID, a requested or prepaid amount of energy, and any other relevant information. Regardless of the origin of the ID information, it should not uncontrollably change during the entire recharging period, even with recharging interrupts, until it expires after a predetermined time period or the recharging is complete.

The following detailed description of the preferred embodiment demonstrates a use of an electronic ID device with ID assigned to it by a recharging station. The power line communication (PLC) is used for information exchange between a station and a remote ID device. While the following description assumes a charging cable attached to the vehicle plugging into a receptacle located in the recharging station, it stays valid, with the appropriate adjustments, for a situation, when the charging cable permanently attached to the recharging station gets plugged into a recharging receptacle located on the vehicle, and for any possible variations in between.

A functional diagram on FIG. 2 illustrates the Vehicle Identification System implemented in this embodiment.

The System Events logical module 51, in response to certain external and internal system events, generates requests to start system or to stop recharging for a Vehicle Identification logical module 50.

The following events may trigger the Start System request:
Recharging Cable Connected
Power Restored
Service Authorized
Ticket Number Obtained The following events may trigger the Stop Recharging request:
Recharging Cable Disconnected
Loss of Power in the Power Source Circuit
Recharging Error
Safety system calls (short circuit, ground fault, overvoltage, overcurrent, etc)
Battery Is Full
STOP button pressed The Vehicle Identification logical module 50 comprises an ID Requestor 10, ID Generator 11, ID Storage 12, ID Comparator 14, ID Validator 19, and a Communicator 13, which communicates through the communication link 16 with a Remote ID Device 15.

A Billing logical module 17 associates an ID received from the Vehicle Identification module 50 with the electric energy usage from a Power Controller/Energy Meter 18 and a current time stamp, and provides a Power On/Power Off command to the Power Controller/Energy Meter 18, which responds to the command by turning the power on or off at the vehicle recharging cable.

When a recharging cable plug connects with a recharging station receptacle or when the power is restored after an outage the System Events module 51 generates a Start System request to the ID Requestor 10. The ID Requestor 10 sends the ID request to the Remote ID Device 15, located in the vehicle or attached to the vehicle, using Communicator 13 via the communication link 16. In this particular example the communicator comprises a PLC modem and the communication link is a conductor of the charging cable.

If the vehicle has been previously connected to a station and the Remote ID Device 15 still carries a valid (not expired) ID, this device sends the ID back to the Communicator 13 through the communication link 16. The Communicator 13 sends the received ID to the ID Comparator 14, which compares it to every ID found in the ID Storage 12. If a match is found, the ID Comparator 14 sends this ID to the Billing module 17 to ensure that the energy usage for recharging is added to the previous charges associated with this ID. Then the Billing module 17 generates a Power On command for the Power Controller/Energy Meter 18, which in turn switches on electric current from the power source via the recharging cable to the vehicle battery and recharging process resumes. The electric energy used for recharging is recorded in the Billing module 17 where it is also associated with a vehicle ID.

If the ID match is not found, the ID Comparator 14 sends a request to the Service Authorization module 52 to provide an authorization. When the authorization is provided (e.g. in a form of a payment, a charge card, a ticket read, etc.), the module 52 sends a request to the ID Generator 11 to generate a new ID. When generated, the new unique ID is stored in the ID Storage 12, transferred to the Billing Module 17, and communicated to the Remote ID Device 15 via the Communicator 13 and the communication link 16. This new ID will be stored in the Remote ID Device 15 until it is deleted by the recharging station or expires after a predetermined period of time (say 12 hours).

If no ID is received from ID Device the Communicator 13 sends a 'No ID' message to the Service Authorization module 52, and then the sequence of events described in the 'ID match not found' case above is repeated. This way, if the connected for recharging vehicle does not have a Remote ID Device installed, the system will require authorization every time it is connected, which ensures full compatibility of any vehicle with the recharging station.

At any moment when the requested service authorization is not received, the system goes into a waiting mode.

The recharging is considered completed when the client recharging service request set during service authorization is satisfied. Such client request may include recharging until the battery is full or the specific amount of recharging energy expressed either in time units, or energy units (or any other units) or the amount of prepayment for the service.

The Battery Full event triggers a "Stop Recharging" request from the Systems Events module 51 to the ID Validator 19 of the Vehicle Identification module 50. The ID Validator 19 sends the current ID to the Billing module 17 to close the sale associated with this ID and generates a command 'Delete ID' to the Remote ID Device 15, and also deletes this ID from the ID Storage 12.

When a request for a specific amount of energy (or payment) is fulfilled, the Billing Module 17 closes the sale associated with this ID and sends a message 'Recharging Complete' to the ID Validator 19, which generates a command 'Delete ID' to the Remote ID Device 15, and also deletes this ID from the ID Storage 12.

If a Stop button (not shown) is pressed before the completion of the recharging process, the System Events module 51 sends a command 'Stop Recharging' to the ID Validator 19, which generates a command 'Delete ID' to the Remote ID Device 15, and also deletes this ID from the ID Storage 12. The ID Validator 19 also sends an "ID to Close Sale" message to the Billing 17, which closes the sale for this ID.

If the vehicle is unplugged prior to completion of recharging, the system disconnects the power and goes into a Ready mode, waiting for the cable plug-in.

The ID Validator 19 periodically checks time stamps of all the IDs stored in the ID Storage 12. An ID is considered expired after a predetermined period of time from the last use. If an expired ID is found, the ID Validator 19 deletes the expired ID from the ID Storage 12 and sends an "ID to Close Sale" message to the Billing 17, which closes all the sales associated with this ID.

As follows from the description above, a service authorization is necessary in order to start recharging. Generally, an authorization to get services is the association of the vehicle with the amount and/or method of payment for these services selected by a client. To authorize recharging a client may use cash payment, credit card payment, or any media issued by a garage authority, such as a plastic card with a magnetic strip, a plastic card with a memory chip, a plug-in into the station key-chain device and other methods, where the client account information is encoded on the media. The station may accept one of the above authorization methods to authorize recharging from a stand-alone station or a network station in an attended garage, however the familiar paper ticket procedure can also be used. A service authorization with paper ticket can be implemented as a reading of the unique number from a ticket bar code scanned in the station bar-code reader. Such paper ticket may contain up to 3 parts with the same bar code. One part of the ticket is for keeping in the garage office, another part is for the client and the $3^{rd}$ part is for scanning it in the station and keeping in the vehicle or by attendant. Other variants of a vehicle service authorization can also be implemented.

There are different payment and billing scenarios, which could be described, but omitted here because they are not directly related to the present invention. Such scenarios include a service authorization in some form: in garages with or without parking attendants, with a prepayment or a payment at garage exit, with billing by garage authority or by electric utility company.

An ID Device located within the vehicle or built-in into the vehicle's charging cable can communicate via such cable to a recharging station. Referring to FIG. 5, the ID device includes an ID Storage 22 for storing vehicle electronic ID and a Communicator 21 for communicating with the charging station. The ID Storage 22 is preferably a non-volatile memory type, so that the loss of power does not affect the stored ID. The Communicator 21 is needed for receiving an ID generated and sent by a recharging station, as well as receiving requests from a recharging station to submit the stored ID, sending the stored ID back to the station and deleting that stored ID on the station request. The ID Device may store a number of different IDs received from various stations. In case the vehicle gets disconnected prior to the end of the recharging period, an optional ID Expirator 23 is included to delete a stored ID after a predetermined period of time. Alternatively a FIFO (first-in-first-out) memory may be used for ID Storage, so that the most recent IDs are stored up to the device memory capacity.

A Stand-alone Recharging Station using the proposed vehicle identification method may be built according to the block diagram of FIG. 3. Here, the Processor 1, comprising a microcontroller with on-board memory, represents the core of the system. Referring to FIG. 2, the Processor 1 implements the ID Generator 11, ID Storage 12, ID Validator 19, ID Comparator 14, Service Authorization module 52, and Billing module 17.

The Manual Input Device 2 comprises a number of push-buttons (or equivalent user entry devices, e.g. touch screen buttons) for user selection (e.g. 20 kWHr, 4 Hrs, $10, $20, full battery fill up, or other similar buttons defining recharging duration). This device also includes a Cancel button to cancel an entry, and a Stop button, to manually stop recharging at any moment prior to completion.

A Display 6, comprising a number of indicators and/or a visual device (LED, LCD screen, and such), and connected to the Processor 1 communicates the system messages to the user.

A Payment Receptor 3 may include a cash receptor, a credit card reader, a barcode reader, and any other device capable of reading an appropriate authorization media. It may also include a receipt printer. The Payment Receptor 3 is a part of the Service Authorization module 52.

A Vehicle Identifier Module 4 implements the ID Requestor 10 and the Communicator 13.

A Cable Connector 5 connects to a vehicle recharging cable to supply recharging energy from the Power Controller 7 to the vehicle. It also interfaces the Vehicle Identification Module 4 to the Recharging Cable 16 for communication with the Remote ID Device 15. The Cable Connector 5 is equipped with a detector switch to detect when the recharging cable 16 is connected and disconnected. This switch along with the buttons of the Manual Input Device 2 comprises a System Events module 51.

The Power Controller 7 implements the Power Controller/Energy Meter module 18 that connects and disconnects power from the recharging Power Source 8 to the Cable Connector 5, based on commands received from the Processor 1. The Power Controller also communicates the Energy Meter readings to the Processor 1 for billing. The Power Controller 7 comprises a power ON/OFF Switch, an Energy Meter and Protection Circuitry. It may also provide control of the recharging parameters, such as recharging current, voltage, etc.

A Network of Recharging Stations may be implemented for large parking and garage facilities. Network implementation is especially effective for facilities with attendants or valet parking. An example of such implementation is shown on a block diagram of FIG. 4. This example assumes an attended facility with multiple entrances and exits. A standard three-part paper ticket processing is selected for compatibility with existing parking facilities practice.

The network of recharging stations comprises a Central Unit, a number of Recharging Stations, and a number of Payment Stations interconnected in a network.

Recharging Stations in a network include a Network Interface Device 101 to enable network communication, and substitute the Payment Receptor 3 with a Ticket Reader 9. The Processor 1 no longer implements the ID handling and storage functions, billing and authorization.

These functions (ID Generator 11, ID Comparator 14, ID Validator 19, ID Storage 12, Billing 17, and Service Authorization 52) are implemented in a Central Unit, which may be located in a central office of the facility. The Central Unit comprises a Processor 30, which controls operation of the entire network, a Manual Input Device 32 for user manual data input, a Ticket Reader 35 for reading a number from a parking ticket, a Display 36 for showing visual information to the user, a Central Vehicle Identifier (CVI) module 33 for identification of a vehicle connected to any station on the network and a Central Billing Module 34 (CBM) for central billing and payment processing. Both CVI and CBM can be implemented as software or hardware modules. CVI here further comprises a central ID Storage 37 (CIS) for storage of any ID generated by any station on the network and a central ID Comparator 38 (CIC) for comparing incoming vehicle ID with ID stored in CIS. This variant of CVI implements the idea that new IDs are generated and deleted by a Vehicle Identifier module of a station connected to a vehicle and not by the central unit CVI. The Central Unit is connected to the network with a Network Interface Device.

Another variant of CVI can be also implemented, where in addition to CIS and CIC the following modules can be included: a central ID Generator for generating new IDs, a central ID Validator for deleting expired IDs and deleting IDs on the recharging complete and the sale closed events. This variant of the CVI reflects the idea that a central vehicle identification module will generate, store, assign and delete all IDs in the network.

The Payment Station in the FIG. 4 comprises a Processor 40, a Display 46 for providing visual information to the user; a Manual Input Device 42 for selecting the amount of energy for recharging and other tasks that require manual input; a Payment Receptor 43, such as a cash receptor, credit card reader, charge card reader or any other payment or billing authorization card reader to pay for services; a ticket reader for reading a ticket that linked to the services provided to a vehicle.

Other variants of implementation of the network of recharging stations are certainly possible and implied by this invention.

Following is the example of network operation, while it is understood that other scenarios are possible without deviating from the scope of the present invention.

Upon entering a parking facility a client or a vehicle operator communicates to parking personnel a desired amount of recharging energy, or recharging time, or payment for recharging, or full battery fill-up. This authorization data will be used in the service authorization process. For any vehicle entering the parking a new three-part paper ticket is issued. All ticket parts carry the same unique bar-coded number. A facility operator or an attendant gives one part of that ticket to a client, keeps another part of the ticket in the office, and uses the third part for vehicle authorization at the recharging station.

After moving the car to any recharging station the attendant connects a recharging cable to the station's connector and the station generates a request for vehicle ID to be sent to the vehicle's remote ID Device.

If the recharging station receives a vehicle ID in response to said request then the station sends this ID to the Central Unit's CVI module for identification. If the ID is recognized there as previously authorized, the Central Unit sends a command to the station to resume recharging.

If the station does not receive any ID from the connected vehicle remote ID Device, or if the received ID is not recognized by CVI as previously authorized then the station displays a request to scan a ticket. The attendant then scans the ticket and the station receives the ticket number, generates a new ID and links this new ID to the obtained ticket number. Then the request for authorization data associated with this ticket number is sent to CBM. Such authorization data can include authorized by the vehicle operator amount of energy to be used in recharging or the recharging time, or the recharging capacity, or the amount of payment, and/or method of payment. Authorization data and the ticket number may be entered at the vehicle entrance into the garage. If the authorization data has already been associated with the ticket number and stored in CMB, then, in response to the recharging station request, it is sent back to the station to define normal completion of the recharging process. Otherwise, the attendant using Manual Input device of the recharging station enters the data authorized by vehicle operator (e.g. recharging energy in kWHr, recharging time, recharging battery capacity, amount and method of payment or other data that may defy recharging duration). Such authorization data together with the ticket number and generated new ID are linked together. The newly generated ID is sent to the vehicle's remote ID Device, as well as to the Central ID Storage of CVI for further reference and to Central Billing Module (CBM) for billing. After that the recharging begins.

When the recharging is successfully completed or stopped by pressing a Stop button the amount of energy usage together with vehicle ID are sent to CMB. Since recharging process is finished, CMB sends a command to Central ID Validator to delete this vehicle ID from the Central ID Storage and also sends the Delete ID command to the recharging station. The station in response of Delete ID command communicates an instruction to delete this ID to the remote ID Device of the connected vehicle.

Before leaving the facility a garage attendant or a vehicle operator scans the vehicle ticket again. At that moment all sales associated with this ticket in CBM become closed, the vehicle ID that becomes deleted from any storage on the network, if it has not been deleted before, and a combined bill for all services is generated. The vehicle is released from the facility only after the payment is received or charged to the client account by the Payment Station.

If the vehicle ID lifetime interval expires prior to completion of recharging the ID Validator module of the CVI deletes this ID from the Central ID Storage (CIS) and sends it to the CBM for closing all sales associated with this ID. This may happen if located in the garage a vehicle has not been reconnected to any recharging station to complete recharging after it was interrupted.

Similarly to the stand-alone station application, if the ID cannot be deleted from a remote ID Device on request then this ID will expire after the ID lifetime interval and then will be deleted from ID device.

If a parking facility is operated the way that a vehicle may exit it before closing sales or before recharging is completed then such parking facility should include a prepayment or payment authorization before beginning of any services. If a vehicle exits parking without closing its sale then the vehicle ID stored on the network will expire after a predefined ID lifetime interval and at that time all sales linked to this ID become closed and bill is created, then the vehicle ID is deleted from any storage on the network.

Here is another likely operational scenario for an unattended parking facility.

On entrance to the unattended parking facility a client or a vehicle operator receives a ticket with a unique bar-coded number. A vehicle operator finds the available recharging station and connects the vehicle to it by the cable. The sensor in the station's cable connector generates a Recharging Cable Connected event and the station displays a request to scan the ticket, if a ticket has not already been scanned. If the operator first scans the ticket, the Ticket Number Obtained event is generated and the station displays a request to connect recharging cable. After both these operations are completed by the vehicle's operator the station displays a request to select payment method and/or payment amount, as it is common now in gasoline stations.

If a client selects a prepayment amount and makes a payment, then no other authorization is required to start recharging. If a client has successfully authorized a credit card charge or a client account charge, then further definition of recharging duration is needed and the station displays a request to enter either the amount of recharging energy, recharging time or battery capacity to fill-up. That authorization data becomes associated with the ticket number and stored in the Billing module. The station then generates the Service Authorized event that triggers Start System command as in FIG. 2, which in turn triggers ID Requestor and a request for vehicle ID is sent to the connected vehicle. All other ID related steps are described above.

On exit of unattended parking facility if the credit card or client account charge was previously authorized the vehicle operator must scan his ticket in the payment station ticket reader to complete sales. At that moment, a bill is created and the vehicle ID, which was stored in the recharging station, in the remote ID device or in the central unit is deleted from the network.

Other implementations of the vehicle ID method in the network are certainly possible without departing from the scope and spirit of the invention.

What is claimed is:

1. A vehicle identification system for electric vehicles comprising:
    an enclosure;
    vehicle identification requesting means within said enclosure for creating a vehicle-identification request;
    remote responding means positioned outside of said enclosure for receiving the vehicle-identification request created by said vehicle identification requesting means and creating a vehicle identification message after and in response to receipt of said vehicle-identification request, said remote responding means being configured to create the vehicle identification message including an identification that expires after a predetermined time period or once recharging of the vehicle is complete;
    communication means for communicating between said vehicle identification requesting means and said remote responding means to enable transfer of the vehicle identification message from said remote responding means to said vehicle identification requesting means;
    message storage means positioned within said enclosure for storing the vehicle identification message for reference; and
    comparison means within said enclosure for comparing a vehicle identification message received from a vehicle via said communication means with said vehicle identification message previously stored for reference in said message storage means and generating a pass signal when both these messages identify the same vehicle.

2. A vehicle identification method for electric vehicles comprising:
    a step for generating a request for vehicle identification using a vehicle identification requesting device;
    a step for communicating said request from vehicle identification requesting device to a remote responding device arranged in association with a vehicle;
    a step for creating a vehicle identification message by the remote responding device after and in response to said request, said creating step including creating the vehicle identification message to include an identification that expires after a predetermined time period or once recharging of the vehicle is complete;
    a step for communicating said vehicle identification message from the remote responding device to the vehicle identification requesting device;
    a step for storing a vehicle identification message in message storage for further reference;
    a step for generating another request for vehicle identification by the vehicle identification requesting device, when vehicle identification is required; and
    a step for identifying a vehicle by comparing the received vehicle identification message with one stored as reference and generating a pass signal if both these messages identify the same vehicle.

3. The vehicle identification system of claim 1, wherein said remote responding means further comprise data input means for creating a vehicle identification message.

4. The vehicle identification system of claim 1, wherein said communication means further comprise at least one wire.

5. The vehicle identification system of claim 1, wherein said communication means further comprise a wireless transmitter and receiver.

6. The vehicle identification system of claim 5, wherein said wireless transmitter and receiver use electromagnetic waves for communication.

7. The vehicle identification system of claim 5, wherein said wireless transmitter and receiver use acoustic waves for communication.

8. The vehicle identification system of claim 5, wherein said wireless transmitter and receiver use visible light for communication.

9. A vehicle identification system for electric vehicles comprising:
    an enclosure;
    vehicle identification requesting means within said enclosure for creating a vehicle-identification request;
    vehicle identification message generating means within said enclosure for creating a vehicle identification message, said vehicle identification generating means being configured to create the vehicle identification message including an identification that expires after a predetermined time period or once recharging of the vehicle is complete;
    remote responding means positioned outside of said enclosure for storing said vehicle identification message and returning it after and in response to receipt of said vehicle identification request;

communication means for communicating between said vehicle identification requesting means and said remote responding means to enable transfer of the vehicle identification message from said vehicle identification message generating means to said remote responding means, subsequent transfer of said vehicle-identification request and a subsequent transfer of another vehicle identification message, derived from the received vehicle identification message, from said remote responding means to said vehicle identification requesting means in response to said request;

message storage means positioned within said enclosure for storing the vehicle identification message for reference; and comparison means within said enclosure for comparing a received vehicle identification message received from a vehicle via said communication means with said vehicle identification message previously stored for reference in said message storage means and generating a pass signal when both these messages identify the same vehicle.

10. A vehicle identification method for electric vehicles comprising:

a step for generating a vehicle identification message using a vehicle identification generating device, said generating step including generating the vehicle identification message to include an identification that expires after a predetermined time period or once recharging of a vehicle is complete;

a step for storing a vehicle identification message in message storage for further reference;

a step for communicating said vehicle identification message to a remote responding device arranged in association with the vehicle;

a step for storing the vehicle identification message in the remote responding device;

a step for generating a request for vehicle identification using a vehicle identification requesting device, when vehicle identification is required;

a step for communicating said request from the vehicle identification requesting device to the remote responding device;

a step for communicating another vehicle identification message, derived from said vehicle identification message from the remote responding device to the vehicle identification requesting device after and in response to receipt of said request by the remote responding device; and a step for identifying a vehicle by comparing the received vehicle identification message with one stored as the reference and generating a pass signal if both these messages identify the same vehicle.

11. An electric vehicle identification device associated with a vehicle, comprising:

message generating means within or on the vehicle for generating a vehicle identification message, said message generating means being configured to generate the vehicle identification message including an identification that expires after a predetermined time period or once recharging of the vehicle is complete;

memory means within or on the vehicle for storing at least one said vehicle identification message; and communication means at least partly within or on the vehicle for communicating another vehicle identification message, derived from said at least one identification message stored in said memory means, to an electric vehicle recharging station.

12. An electric vehicle identification device associated with a vehicle that communicates with an electric vehicle recharging station, comprising:

communication means within or on the vehicle for receiving at least one vehicle identification message from the electric vehicle recharging station at a beginning of recharging;

memory means within or on the vehicle for storing of at least one said vehicle identification message received from the recharging station;

responding means for returning another vehicle identification message, derived from the at least one said vehicle identification message stored in said memory means, in response to a vehicle identification request received from the recharging station; and identification message expiration means for removing or causing removal of said at least one identification message from the memory means after a predetermined period of time or once recharging of the vehicle is complete.

13. The vehicle identification system of claim 1, wherein said remote responding means are attached to a vehicle.

14. The vehicle identification system of claim 1, wherein said remote responding means are located in a vehicle.

15. The vehicle identification system of claim 1, wherein said remote responding means are configured to create the vehicle identification message to include prerecorded fixed identification information or new identification information generated each time a charging cycle is initiated.

16. The vehicle identification system of claim 1, wherein said remote responding means create the vehicle identification message including an identification that expires after a predetermined time period.

17. The vehicle identification system of claim 1, wherein said remote responding means create the vehicle identification message including an identification that expires once recharging of the vehicle is complete.

18. The vehicle identification system of claim 5, wherein said wireless transmitter and receiver use infrared communications.

19. The vehicle identification system of claim 9, wherein said remote responding means are configured to receive an assigned identification from an identification generating means in said enclosure via said communications means, store the assigned identification and then create the vehicle identification message based on the stored, assigned identification.

20. The vehicle identification system of claim 9, wherein said remote responding means further comprise data input means for creating a vehicle identification message.

21. The vehicle identification system of claim 9, wherein said communication means further comprise at least one wire.

22. The vehicle identification system of claim 9, wherein said communication means further comprise a wireless transmitter and receiver.

23. The vehicle identification system of claim 22, wherein said wireless transmitter and receiver use electromagnetic waves for communication.

24. The vehicle identification system of claim 22, wherein said wireless transmitter and receiver use acoustic waves for communication.

25. The vehicle identification system of claim 22, wherein said wireless transmitter and receiver use visible light for communication.

26. The vehicle identification system of claim 22, wherein said wireless transmitter and receiver use infrared communications.

* * * * *